US008335764B2

(12) United States Patent
Ochs et al.

(10) Patent No.: US 8,335,764 B2
(45) Date of Patent: Dec. 18, 2012

(54) MULTICAST ADDRESS SEARCH INCLUDING MULTIPLE SEARCH MODES

(75) Inventors: Matthew R Ochs, Austin, TX (US);
Omar Cardona, Austin, TX (US);
Baltazar De Leon, III, Austin, TX (US);
James B Cunningham, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 238 days.

(21) Appl. No.: 12/727,332

(22) Filed: Mar. 19, 2010

(65) Prior Publication Data
US 2011/0231406 A1     Sep. 22, 2011

(51) Int. Cl.
*G06F 17/30*     (2006.01)
(52) U.S. Cl. .................. 707/634; 719/321; 719/327
(58) Field of Classification Search .................. 707/748, 707/634
See application file for complete search history.

(56) References Cited

U.S. PATENT DOCUMENTS

| | | | |
|---|---|---|---|
| 6,732,184 B1 | 5/2004 | Merchant | |
| 6,877,056 B2 * | 4/2005 | Cypher | 710/244 |
| 2003/0012196 A1 | 1/2003 | Ramakrishnan | |
| 2006/0146829 A1 | 7/2006 | Yamada | |

OTHER PUBLICATIONS

QNX, (Network DDK Guide, topic Writing a Network Driver), © 2000-2007, QNX Software System GmbH & Co, KG, pp. 1-23.*
"Writing a Network Driver", QNX.com website as crawled by Internet Archive Wayback Machine on May 31, 2008. Available at http://web.archive.org/web/20080531020511/http://www.qnx.com/developers/docs/6.3.2/ddk_en/network/writing.html.*
Cisco—"Internet Protocol Multicast", Internetworking Technologies Handbook, (downloaded from www.cisco.com on Jan. 15, 2010).
Fairhurst—"Unicast, Broadcast, Multicast", (Oct. 3, 2009).
Filepie—"Promiscuous Mode", (downloaded from www.filepie.us on Jan. 22, 2010).
IBM—IP.com No. IPCOM000182346D "Method for Reducing CPU Utilization in Stack via Driver Multicast Address Filtering during Overflow", Original Publication Date: Apr. 27, 2009.
Ioctl—Wikipedia; (downloaded from www.en.wikipedia.org on Jan. 18, 2010).
Microsoft—Microsoft TechNet; (downloaded from www.technet.microsoft.com on Jan. 22, 2010).

* cited by examiner

*Primary Examiner* — Rehana Perveen
*Assistant Examiner* — Alexander Khong
(74) *Attorney, Agent, or Firm* — David Mims; Mark P Kahler (57) ABSTRACT

An information handling system (IHS) includes a network adapter having a hardware address store that stores multicast addresses and a device driver that stores multicast addresses in a software address store. When there is no more storage space available in the hardware address store for multicast addresses, the device driver stores multicast addresses in the software address store. When the IHS receives a multicast information packet, the network adapter searches the hardware address store for a multicast address corresponding to that multicast information packet. If the search of the hardware address store does not find that multicast address, then the device driver searches the software address store for that multicast address. The IHS may prioritize the multicast addresses in the hardware address store and the software address store on a most frequently used basis, a most recently used basis or a most popular basis. For example, the hardware address store may store addresses that are more frequently used than those in the software address store.

17 Claims, 5 Drawing Sheets

MULTICAST ADDRESS SEARCH INCLUDING MULTIPLE SEARCH MODES

BACKGROUND

The disclosures herein relate generally to information handling systems (IHSs), and more specifically, to handling information that the IHS receives from networked devices.

Information handling systems (IHSs) may receive information packets via a number of different modes. Unicast mode refers to a single source sending an information packet to a particular destination as opposed to sending the packet to several destinations. In contrast, broadcast mode refers to a single source sending an information packet to all destinations in a particular network. In multicast mode, a source sends an information packet to a group of destinations. Multicast mode is useful for streaming information such as audio information and video information to reduce the bandwidth demand on the source.

BRIEF SUMMARY

In one embodiment, a method of processing a multicast address request is disclosed. The method includes receiving, by a device driver of an information handling system (IHS), a multicast address request having a particular multicast address associated therewith. The method also includes testing, by the device driver, to determine if storing the particular multicast address in a hardware address store would exceed the storage capacity of the hardware address store, the hardware address store being in a network adapter of the IHS and including a plurality of multicast addresses. The method further includes storing, by the device driver, the particular multicast address in the hardware address store in the network adapter if the testing step determines that storing the particular multicast address in the hardware address store would not exceed the storage capacity of the hardware address store. The method still further includes storing, by the device driver, the particular multicast address in a software address store in the device driver if the testing step determines that storing the particular multicast address in the hardware address store would exceed the storage capacity of the hardware address store.

In another embodiment, an information handling system (IHS) is disclosed. The IHS includes a processor. The IHS also includes a network adapter, coupled to the processor, that receives multicast information packets, the network adapter including a hardware address store that stores a plurality of multicast addresses. The IHS further includes a memory coupled to the processor, the memory being configured with an application that generates a multicast address request, the memory being further configured with a device driver that receives a multicast address request having a particular multicast address associated therewith. In one embodiment, the device driver tests to determine if storing the particular multicast address in the hardware address store would exceed the storage capacity of the hardware address store to store multicast addresses. The device driver stores the particular multicast address in the hardware address store in the network adapter if the device driver determines that storing the particular multicast address in the hardware address store would not exceed the storage capacity of the hardware address store. Alternatively, the device driver stores the particular multicast address in a software address store in the device driver if the device driver determines that storing the particular multicast address in the hardware address store would exceed the storage capacity of the hardware address store.

In yet another embodiment, a computer program product is disclosed. The computer program product includes a computer readable storage medium. The computer program product also includes first program instructions that receive a multicast address request having a particular multicast address associated therewith. The computer program product further includes second program instructions that test to determine if storing the particular multicast address in a hardware address store would exceed the storage capacity of the hardware address store, wherein the hardware address store is in a network adapter of an IHS and includes a plurality of multicast addresses. The computer program product still further includes third program instructions that store the particular multicast address in the hardware address store in the network adapter if storing the particular multicast address in the hardware address store would not exceed the storage capacity of the hardware address store. The computer program product also includes fourth program instructions that store the particular multicast address in a software address store of a device driver if storing the particular multicast address in the hardware address store would exceed the storage capacity of the hardware address store. The first, second, third and fourth program instructions are stored on the computer readable storage medium.

BRIEF DESCRIPTION OF THE DRAWINGS

The appended drawings illustrate only exemplary embodiments of the invention and therefore do not limit its scope because the inventive concepts lend themselves to other equally effective embodiments.

DETAILED DESCRIPTION

In one embodiment, the disclosed methodology controls the handling of a multicast address request that an application generates. The multicast address request associates with a particular multicast address for which the application desires the IHS to receive corresponding information packets that relate to that particular multicast address. A device driver determines if a network adapter includes sufficient storage space to store the particular multicast address in a hardware address list within the network adapter. The network adapter includes a finite amount of storage space available in the hardware address list for storing multicast addresses that the network adapter receives. If the network adapter still has sufficient storage available in the hardware address list for the particular multicast address, then the network adapter adds the particular multicast address to its hardware address list. However, if the network adapter does not have sufficient storage available for the particular multicast address, then the device driver stores the particular multicast address in a software address list within the device driver. The software address list in the device driver stores those multicast addresses for which there is no room in network adapter storage.

In another embodiment, the disclosed methodology evaluates a particular incoming information packet to determine which of two different searching modes should apply to the particular information packet. The operating system of the IHS receives the particular information packet via a device driver of the operating system. The network adapter performs a fast hardware-based search to determine if a hardware address list of the network adapter includes the multicast address associated with the received particular information packet. If the hardware address list of the network adapter does include the multicast address of the particular information packet, then the network adapter sends the particular information packet to the application requesting that particular information packet. However, if the hardware address list of the network adapter does not include the multicast address of the particular information packet, then the device driver performs a slower software-based search of the software address list that the device driver stores. If the device driver finds the multicast address of the particular information packet in its software address list, then the device driver sends the particular information packet to the application requesting the particular information packet. However, if the device driver does not find the multicast address of the particular information packet in its software address list, then the device driver discards the particular information packet.

Figure 1:
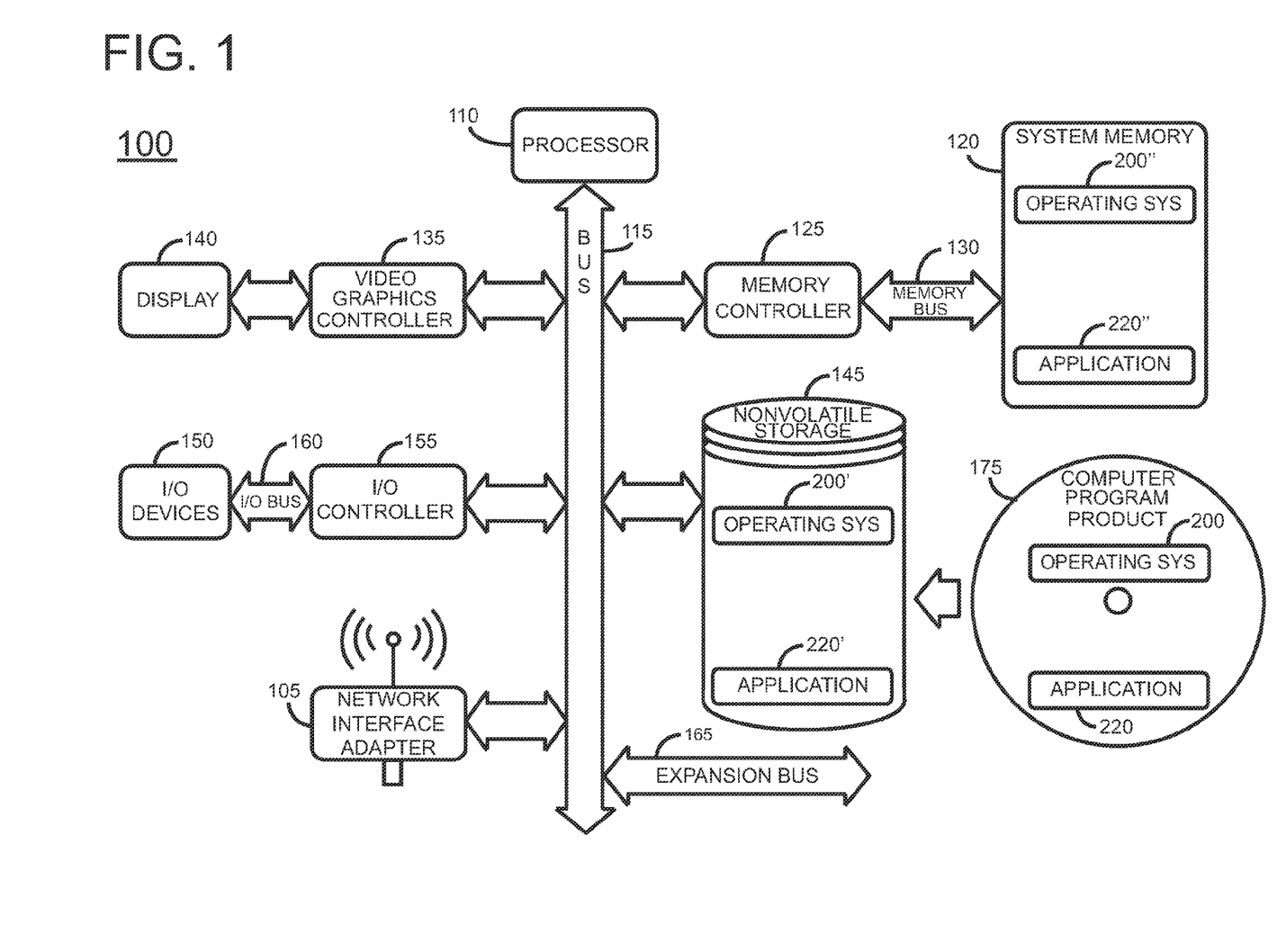
FIG. 1 shows a block diagram of a representative information handling system that employs the disclosed multicast address searching methodology.

FIG. 1 shows an information handling system 100 with an operating system 200 that practices the disclosed multicast information packet handling methodology. IHS 100 includes a processor 110 that may include multiple cores. IHS 100 processes, transfers, communicates, modifies, stores or otherwise handles information in digital form, analog form or other form. IHS 100 includes a bus 115 that couples processor 110 to system memory 120 via a memory controller 125 and memory bus 130. In one embodiment, system memory 120 is external to processor 110. System memory 120 may be a static random access memory (SRAM) array or a dynamic random access memory (DRAM) array. Processor 110 may also include local memory (not shown) such as L1 and L2 caches (not shown). A video graphics controller 135 couples display 140 to bus 115. Nonvolatile storage 145, such as a hard disk drive, CD drive, DVD drive, or other nonvolatile storage couples to bus 115 to provide IHS 100 with permanent storage of information. I/O devices 150, such as a keyboard and a mouse pointing device, couple to bus 115 via I/O controller 155 and I/O bus 160.

One or more expansion busses 165, such as USB, IEEE 1394 bus, ATA, SATA, PCI, PCIE, DVI, HDMI and other busses, couple to bus 115 to facilitate the connection of peripherals and devices to IHS 100. A network interface adapter 105 couples to bus 115 to enable IHS 100 to connect by wire or wirelessly to a network and other information handling systems. In this embodiment, network interface adapter 105 may also be called a network communication adapter or a network adapter. While FIG. 1 shows one IHS that employs processor 110, the IHS may take many forms. For example, IHS 100 may take the form of a desktop, server, portable, laptop, notebook, or other form factor computer or data processing system. IHS 100 may take other form factors such as a gaming device, a personal digital assistant (PDA), a portable telephone device, a communication device or other devices that include a processor and memory.

IHS 100 includes an operating system computer program product on digital media 175 such as a CD, DVD or other media. In one embodiment, a designer or other entity configures the operating system computer program product with a device driver to practice the disclosed multicast address handling methodology. Digital media 175 includes an application 220 that may submit a multicast address request to operating system 200 to monitor and search for information packets that include a particular multicast address. In practice, IHS 100 may store an operating system 200 (OPERATING SYS) and application 220 on nonvolatile storage 145 as operating system 200' and application 220'. When IHS 100 initializes, the IHS loads operating system 200' into system memory 120 for execution as operating system 200". IHS 100 also loads application 220' into system memory 120 as application 220".

As will be appreciated by one skilled in the art, aspects of the disclosed multicast address handling method may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product, such as CPP 575 embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the FIGS. 3, 4 and 5 flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts of FIGS. 3, 4 and 5 and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Figure 3:
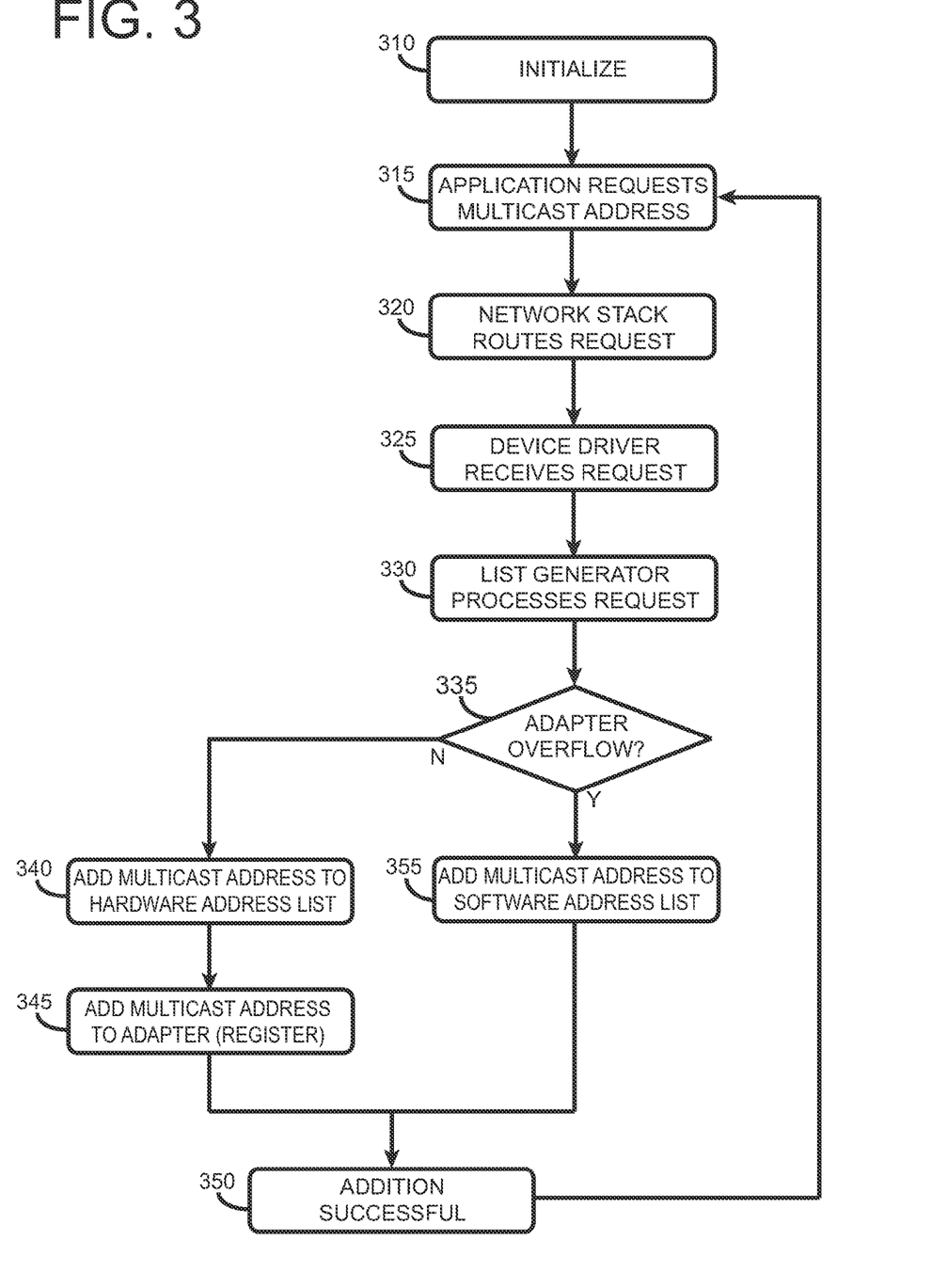
FIG. 3 is a flowchart of one embodiment of the disclosed multicast address searching methodology that depicts the handling of multicast address requests.
Figure 4:
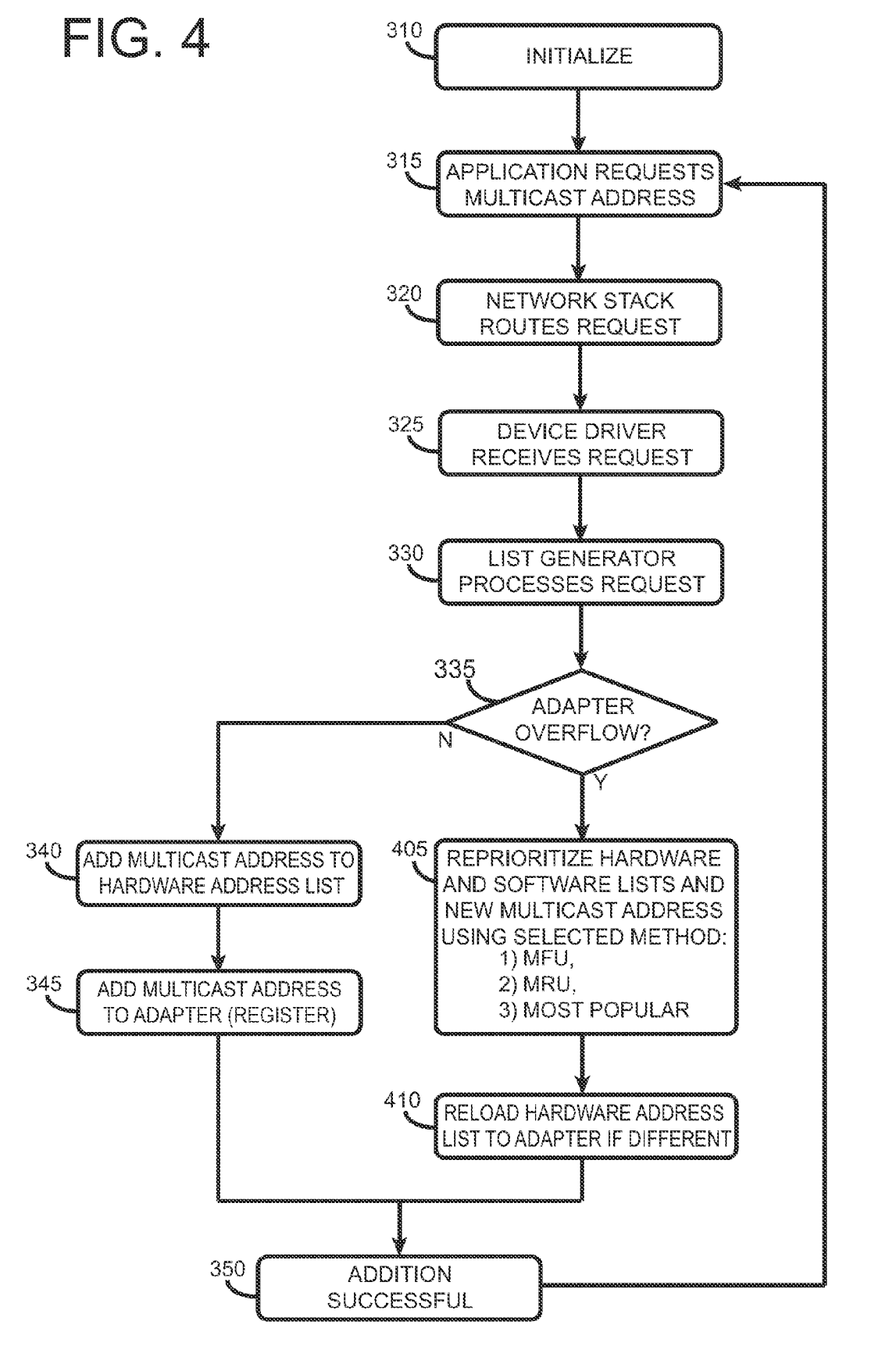
FIG. 4 is a flowchart of another embodiment of the disclosed multicast address searching methodology that depicts the handling of multicast address requests.
Figure 5:
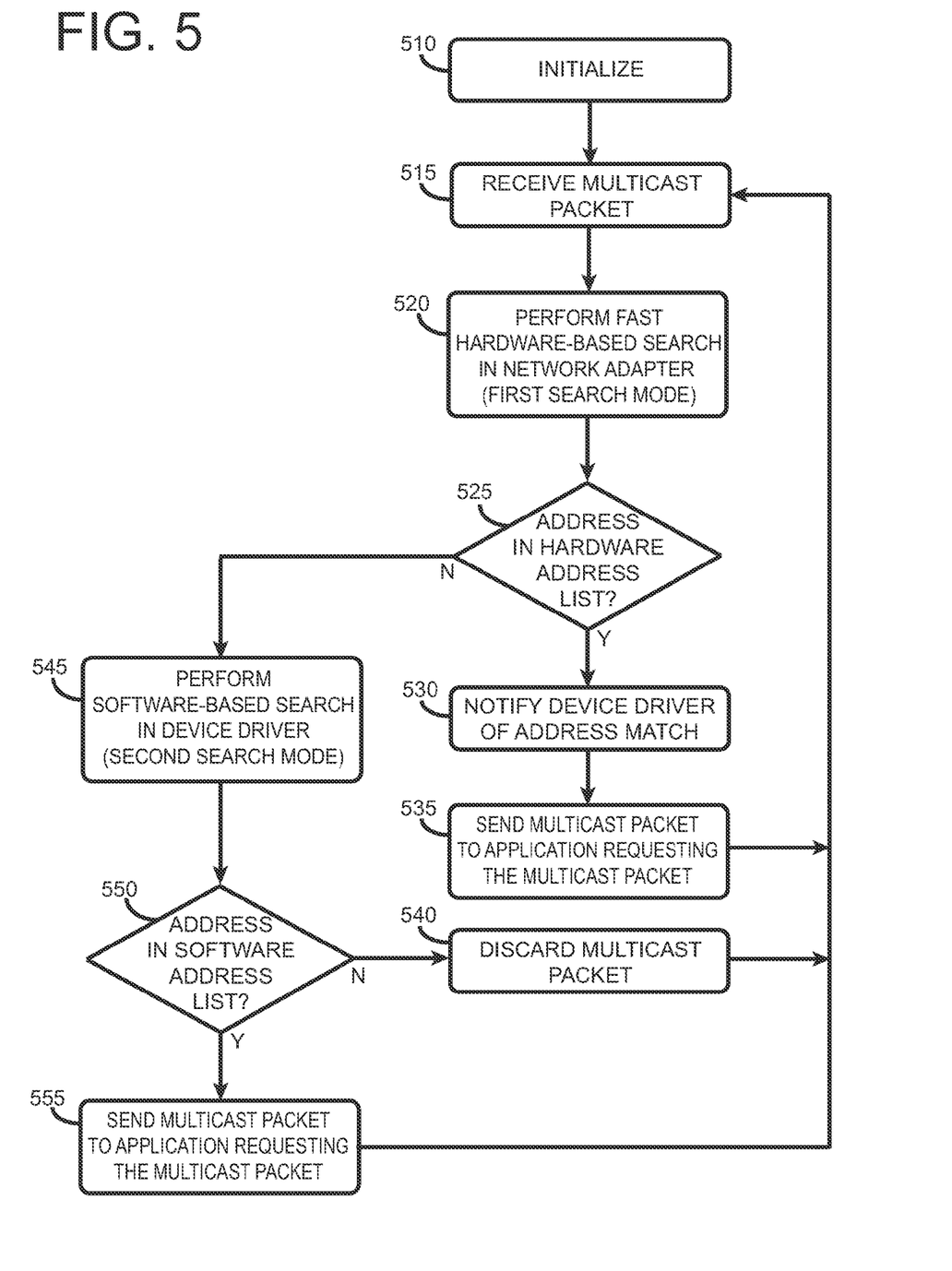
FIG. 5 is a flowchart that depicts the two searching modes of the disclosed multicast address searching methodology.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowcharts of FIGS. 3, 4 and 5 described below.

The flowcharts of FIGS. 3, 4 and 5 illustrate the architecture, functionality, and operation of possible implementations of systems, methods and computer program products that perform network analysis in accordance with various embodiments of the present invention. In this regard, each block in the flowcharts of FIGS. 3, 4 and 5 may represent a module, segment, or portion of code, which comprises one or more executable instructions for implementing the specified logical function(s). It should also be noted that, in some alternative implementations, the functions noted in the block may occur out of the order noted in FIGS. 3, 4 and 5. For example, two blocks shown in succession may, in fact, be executed substantially concurrently, or the blocks may sometimes be executed in the reverse order, depending upon the functionality involved. It will also be noted that each block of FIGS. 3, 4 and 5 and combinations of blocks in the block diagrams and/or flowchart illustration, can be implemented by special purpose hardware-based systems that perform the specified functions or acts, or combinations of special purpose hardware and computer instructions.

Figure 2:
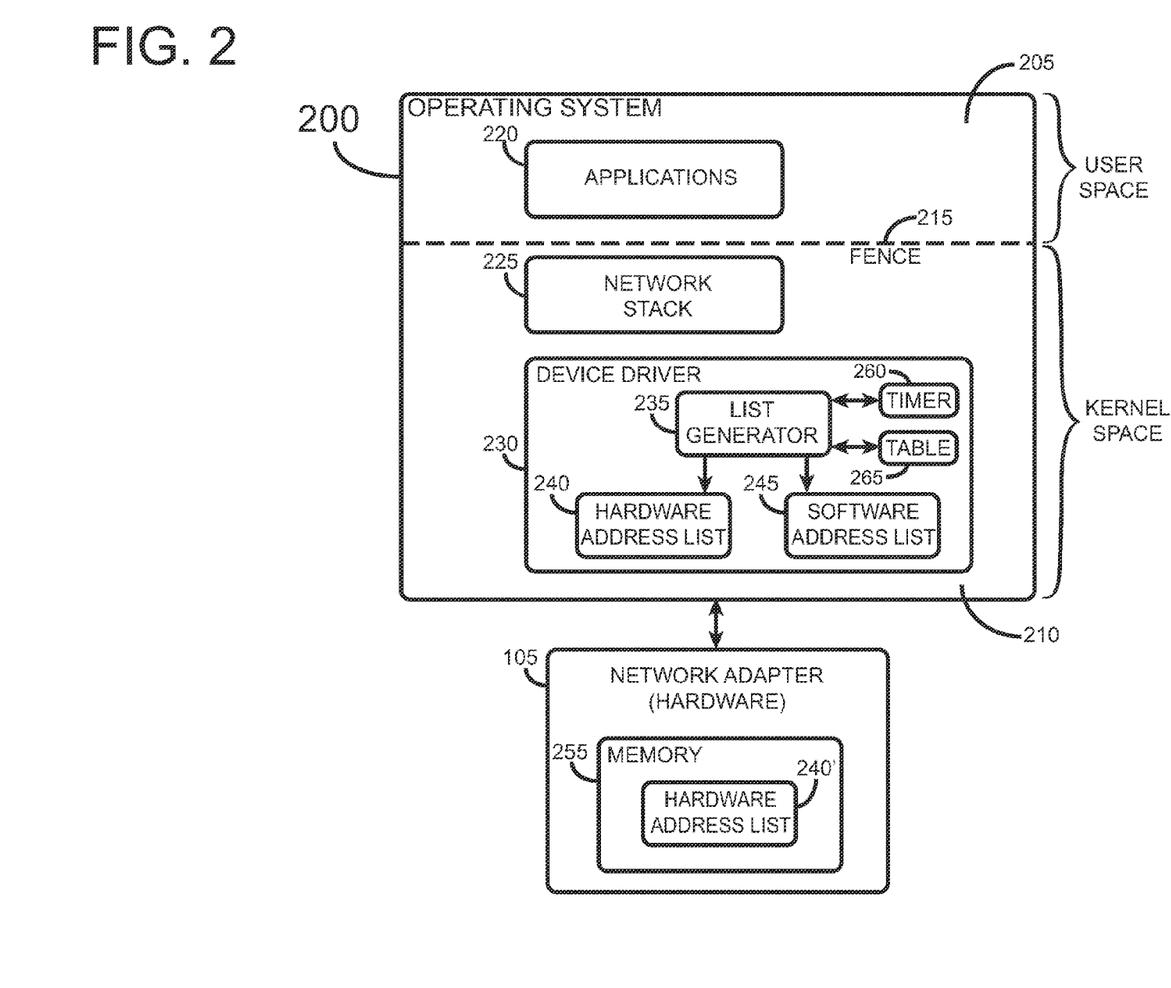
FIG. 2 is a block diagram of an operating system, device driver and network adapter that employ the disclosed multicast address searching methodology.

FIG. 2 is a block diagram representation of operating system 200 that a designer or other entity configures with a device driver to handle multicast address requests and incoming multicast information packets according to the disclosed methodology. IHS 100 stores operating system 200 in system memory 120 as operating system 200". Operating system 200 includes user space 205 and kernel space 210. A fence 215 denotes a conceptual boundary between user space 205 and kernel space 210. User space 205 may include one or more applications 220 that execute from user space 205. Kernel space 210 is the protected domain of operating system 200.

Kernel space 210 of operating system 200 includes a network stack 225. Network stack 225 is a set of protocols that a communications network uses and includes a hierarchy of software layers. Network stack 225 is a layered set of protocols that work together to provide a set of network functions. Communications stack is another term for network stack 225. Kernel space 210 includes a device driver 230 that acts as a kernel extension. Device driver 230 is a software layer that interfaces operating system 200 to network adapter 105. Device driver 230 enables higher level programs such as application 220 to communicate with network adapter 105 which is a peripheral of IHS 100.

Device driver 230 includes a list generator 235, a hardware address list 240 and a software address list 245. Hardware address list 240 is a hardware address store. Software address list 245 is a software address store. Operating system 200, network stack 225 and device driver 230 communicate with network interface adapter or network adapter 105. Network adapter 105 includes a hardware address list 240' in a memory 255 of network adapter 105.

Using incoming multicast address requests from applications 220 as input, list generator 235 of device driver 240 generates hardware address list 240 and software address list 245. List generator 235 determines whether to store a current incoming multicast address request in hardware address list 240 or software address list 245. Device driver 230 replicates or stores hardware address list 240 in network adapter 105 as hardware address list 240'. Hardware address list 240' mirrors hardware address list 240. Memory 255 has a finite amount of storage space in which to store multicast addresses for which network adapter 105 should monitor or filter. If hardware address list 240' still has storage space to store the multicast address of the current multicast address request, then list generator 235 adds that multicast address to hardware address list 240 in device driver 230 and then registers that multicast address in network adapter 105. This registration may take the form of adding the multicast address to hardware address list 240' in network adapter 105, or alternatively, device driver 240 may reload hardware address list 240 from device driver 230 into network adapter memory 255 as hardware address list 240'. In each of these embodiments, hardware address list 240' is an address-per-address copy or mirror of hardware address list 240.

However, if memory 255 in network adapter 105 does not have sufficient storage space to store the multicast address of the current multicast address request in hardware address list 240', then list generator 235 instead stores the multicast address in software address list 245 in device driver 230. Software address list 245 is thus a list that includes those multicast addresses for which no storage space is available in memory 255 of network adapter 105. List generator 235 keeps track of how full hardware address lists 240, 240' are with multicast addresses. When list generator 235 determines that hardware address lists 240, 240' are full with multicast addresses, then list generator 235 stores in software address list 245 those multicast addresses that would not fit in hardware address lists 240, 240'.

With hardware address lists 240, 240' and software address list 245 thus populated with multicast addresses, IHS 100 performs monitoring of incoming multicast information packets in the following manner. The current multicast information packet is the multicast information packet that network adapter 105 currently receives and provides information handling. Network adapter 105 performs a fast hardware-based search to determine if the multicast address of the current multicast information packet is in hardware address list 240'. This hardware-based search corresponds to a first searching mode. This search may be a compare operation. If a match occurs between the multicast address of the current multicast information packet and one of the multicast addresses that adapter 105 stores in hardware address list 240', then network adapter 105 notifies device driver 230 of the match and sends the current multicast information packet to the particular application 220 that requested the multicast packet.

However, if network adapter 105 does not find the multicast address of the current multicast information packet in hardware address list 240', then device driver 230 performs a software-based search of software address list 245 in device driver 230. This software-based search corresponds to a second searching mode. Device driver 230 searches software address list 245 to determine if the multicast address of the current multicast information packet is in software address list 245. This search may be a compare operation. If device driver 230 finds the address of the current multicast information packet in software address list 245, then device driver 230 sends the current multicast information packet to the particular application 220 that requested the multicast packet. However, if device driver 230 does not find the address of the current multicast information packet in software address list 245, then device driver 230 discards the current multicast information packet. IHS 100 then moves on to handle the next received multicast information packet. Since the first mode search that network adapter 105 performs on hardware address list 240' is a hardware-based search, this search may be substantially faster than the second mode software-based search of software address list 245 by device driver 230.

FIG. 3 is a flowchart that shows process flow in one embodiment of the disclosed methodology. IHS 100 initializes at configuration time, as per block 310. An application 220 requests a multicast address, as per block 315. In other words, an application requests that IHS 100 monitor incoming multicast information packets to find those packets that correspond to a particular multicast address, namely the multicast address in the multicast address request. Network stack 225 routes the multicast address request to device driver 230, as per block 320. Device driver 230 receives the multicast address request, as per block 325.

List generator 235 of device driver 230 processes the multicast address request that it receives, as per block 330. More particularly, list generator 235 processes the current multicast address request in the following manner. If at decision block 335 it is found that adding the multicast address in current multicast address request to hardware address list 240' in network adapter 105 does not cause adapter 105 to overflow, then device driver 230 stores that multicast address in the hardware address list 240 in device driver 230, as per block 340. In other words, if hardware address list 240' still has sufficient memory space to store the multicast address of the current multicast address request, then device driver 230 adds that multicast address to hardware address list 240 in device driver 240, as per block 340. Device driver 230 then stores or adds that multicast address to hardware address list 240' in network adapter 105 or updates hardware address list 240' with the hardware address list 240, as per block 345. This action serves to register or store the multicast address of the request in hardware address list 240'. If this addition or storage of the multicast address of the current multicast address request in hardware address list 240' is successful, as per block 350, then process flow continues back to block 315 where application 220 may submit another multicast address request for handling. This next multicast address request then becomes the current multicast address request.

However, if at decision block 335 device driver 230 finds that hardware address list 240' does not include sufficient storage space to store the multicast address of the current multicast address request, such that an overflow condition would occur in memory 255 of network adapter 105, then device driver 230 stores the multicast address of the current multicast address request in software address list 245, as per block 355. Software address list 245 thus stores the multicast addresses of all multicast address requests for which there is no space available in hardware address list 240' of network adapter 105. If this addition or storage of the multicast address of the current multicast request to software address list 245 is successful, as per block 350, then process flow continues back to block 315 where application 220 may submit another multicast address request for handling. As used herein, the term "hardware address list" refers to storing a multicast address in hardware address list 240' for which fast hardware-based searching may be conducted by network adapter 105. As used herein, the term "software address list" refers to storing a multicast address in software address list 245 for which searching is available via a slower software-based search. A software-based search by device driver 230 is typically slower than a hardware-based search by network adapter 105.

FIG. 4 is a flowchart that shows process flow in an alternative embodiment of the disclosed methodology. The flowchart of FIG. 4 includes many blocks in common with the flowchart of FIG. 3. Like numbers indicate like blocks when comparing the flowcharts of FIG. 3 and FIG. 4. As before in the flowchart of FIG. 3, device driver 230 conducts a test at decisions block 335 to determine if network adapter 105 has sufficient storage space to store the multicast address of the current multicast address request. If network adapter 105 does not currently have sufficient storage space to store the multicast address of the current multicast address request, then list generator 235 prioritizes or reprioritizes hardware address list 240 and software address list 245 according to a predetermined prioritization method, as per block 405. In one embodiment, hardware address list 240 stores higher priority multicast addresses while software address list 245 stores multicast addresses with a lower priority than those in hardware address list 240. For example, list generator 235 may prioritize hardware list 240 using 1) most frequently used (MFU) criteria; 2) most recently used (MRU) criteria, or 3) most popular address (MPA) criteria.

If list generator 235 employs the most frequently used (MFU) criteria as the prioritization method, then list generator 235 uses timer 260 to monitor time during a predetermined time interval. List generator 235 maintains a table 265 that includes an entry for each active multicast address for which IHS 100 monitors or filters. Along with each active multicast address, table 265 stores the number of times each multicast address exhibits a hit or packet reception during the predetermined time interval. List generator 235 accesses table 265 to populate hardware address list 240 with the most frequently used active multicast addresses during the predetermined time interval up to the storage limitations of hardware address list 240, 240' and adapter memory 255. If reprioritization block 405 makes any changes to the multicast addresses in hardware address list 240, then device driver 230 reloads hardware address list 240 to network adapter 105 as hardware address list 240', as per block 410.

When list generator 235 populates hardware address lists 240, 240' with higher priority multicast addresses and software address list 245 with lower priority multicast addresses, the higher priority multicast addresses in hardware address list 240, 240' will be subject to a faster first mode search than the second slower software-based mode search of software address list 245 because the first mode search is a hardware-based search. Alternatively, list generator 235 may populate hardware address lists 240, 240' with the most recently used (MRU) or most recently requested multicast addresses in order of recent use. In yet another alternative embodiment, list generator 235 may populate hardware address lists 240, 240' with the most popular multicast addresses by order of popularity.

FIG. 5 is a flowchart that describes process flow in the two mode search that the disclosed methodology employs in one embodiment to process or handle incoming multicast packets. Process flow commences with initialization of IHS 100, as per block 510. IHS 100 receives a particular multicast information packet in a group of multicast information packets that may form an incoming stream, as per block 515. The two mode searching methodology processes the particular received multicast information packet to ultimately forward the particular received multicast packet to an application 220 that requested that multicast information packet. Network adapter 105 performs a fast hardware-based search on the particular received multicast information packet to determine if the multicast address of the multicast information packet is within hardware address list 240' that network adapter 105 stores locally, as per decision block 525. This is the first hardware-based search mode. If network adapter 525 determines that the multicast address of the particular multicast information packet is within hardware address list 240', then network adapter 105 notifies device driver 230 of an address match, as per block 530. In response to this match, network adapter 105 sends the multicast information packet to the particular application 220 that requested this multicast information packet, as per block 535. IHS 100 receives the next multicast information packet as per block 515 and the process continues as seen in FIG. 5.

However, if in decision block 525, network adapter 105 does not find a match between the address of the particular multicast information packet and the addresses that hardware address list 240' stores in the network adapter, then device driver 230 performs a software-based search to engage the second search mode, as per block 545. Device driver 230 performs a test to determine if the multicast address of the particular multicast information packet is in the software address list 245, as per decision block 550. If device driver 230 does not find a match between the address of the particular multicast information packet and a multicast address in software address list 245, then device driver 230 discards the particular multicast information packet, as per block 540. However, if device driver 230 does find a match between the address of the particular multicast information packet and a multicast address in software address list 245, then device driver 230 sends the particular multicast information packet to the particular application 220 that requested that multicast packet, as per block 555.

As will be appreciated by one skilled in the art, aspects of the disclosed memory management technology may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of processing a multicast address request, comprising:

receiving, by a device driver of an information handling system (IHS), a multicast address request having a particular multicast address associated therewith, the device driver including a list generator;

determining, by the list generator of the device driver, whether to store the particular multicast address in a software address list of the device driver or a hardware address list of the device driver, the device driver replicating the hardware address list of the device driver to a network adapter as a replicated hardware address list, such that the replicated hardware address list in the network adapter mirrors the hardware address list in the device driver, wherein the list generator stores the particular multicast address in the hardware address list of the device driver if storing the particular multicast address in the hardware address list of the device driver would not exceed the storage capacity of the network adapter upon replicating the hardware address list of the device driver in the network adapter, and wherein the list generator stores the particular multicast address in the software address list of the device driver if storing the particular multicast address in the hardware address list of the device driver would exceed the storage capacity of the network adapter upon replicating the hardware address list of the device driver in the network adapter.

2. The method of claim 1, further comprising searching in a first searching mode, by the network adapter, the hardware address store to determine if an incoming multicast information packet is associated with a multicast address stored in the hardware address store, and if the incoming multicast information packet is not associated with a multicast address stored in the hardware address store then searching in a second search mode, by the device driver, the software address store to determine if the incoming multicast information packet is associated with a multicast address stored in the software address store.

3. The method of claim 1, further comprising prioritizing the multicast addresses stored in the hardware address store on a most frequently used basis.

4. The method of claim 1, further comprising prioritizing the multicast addresses stored in the hardware address store on a most recently used basis.

5. The method of claim 1, further comprising notifying, by the network adapter, the device driver when the network adapter finds a match between the multicast address of an incoming multicast address request and a multicast address in the hardware address store of the network adapter.

6. The method of claim 1, wherein a list generator in the device driver populates the hardware address store with multicast addresses and further populates the software address store with multicast addresses.

7. An information handling system (IHS), comprising:
a processor;
a network adapter, coupled to the processor, that receives multicast information packets;
a memory coupled to the processor, the memory being configured with an application that generates a multicast address request, the memory being further configured with a device driver that receives a multicast address request having a particular multicast address associated therewith;
the device driver including a list generator that determines whether to store the particular multicast address in a software address list of the device driver or a hardware address list of the device driver, the device driver replicating the hardware address list of the device driver to the network adapter as a replicated hardware address list, such that the replicated hardware address list in the network adapter mirrors the hardware address list in the device driver,
wherein the list generator stores the particular multicast address in the hardware address list of the device driver if storing the particular multicast address in the hardware address list of the device driver would not exceed the storage capacity of the network adapter upon replicating the hardware address list of the device driver in the network adapter, and
wherein the list generator stores the particular multicast address in the software address list of the device driver if storing the particular multicast address in the hardware address list of the device driver would exceed the storage capacity of the network adapter upon replicating the hardware address list of the device driver in the network adapter.

8. The IHS of claim 7, wherein the network adapter is configured to enter a first searching mode to search the hardware address store to determine if an incoming multicast information packet is associated with a multicast address stored in the hardware address store, and the device driver is configured such that if the incoming multicast information packet is not associated with a multicast address stored in the hardware address store then the device driver enters a second search mode to search the software address store to determine if the incoming multicast information packet is associated with a multicast address stored in the software address store.

9. The IHS of claim 7, wherein the device driver prioritizes the multicast addresses stored in the hardware address store on a most frequently used basis.

10. The IHS of claim 7, wherein the device driver prioritizes the multicast addresses stored in the hardware address store on a most recently used basis.

11. The IHS of claim 7, wherein the network adapter notifies the device driver when the network adapter finds a match between the multicast address of an incoming multicast address request and a multicast address in the hardware address store of the network adapter.

12. The IHS of claim 7, wherein a list generator in the device driver populates the hardware address store with multicast addresses and further populates the software address store with multicast addresses.

13. A computer program product, comprising:
a non-transitory computer readable storage medium storing program instructions;
first program instructions to configure a device driver of an information handling system (IHS) to receive a multicast address request having a particular multicast address associated therewith, the device driver including a list generator;
second program instructions that instruct the list generator of the device driver whether to store the particular multicast address in a software address list of the device driver or a hardware address list of the device driver, the device driver replicating the hardware address list of the device driver to a network adapter as a replicated hardware address list, such that the replicated hardware address list in the network adapter mirrors the hardware address list in the device driver,
wherein the list generator stores the particular multicast address in the hardware address list of the device driver if storing the particular multicast address in the hardware address list of the device driver would not exceed the storage capacity of the network adapter upon replicating the hardware address list of the device driver in the network adapter, and
wherein the list generator stores the particular multicast address in the software address list of the device driver if storing the particular multicast address in the hardware address list of the device driver would exceed the storage capacity of the network adapter upon replicating the hardware address list of the device driver in the network adapter.

14. The computer program product of claim 13, further comprising third program instructions to search in a first searching mode the hardware address store to determine if an incoming multicast information packet is associated with a multicast address stored in the hardware address store, and if the incoming multicast information packet is not associated with a multicast address stored in the hardware address store then sixth program instructions search in a second search mode the software address store to determine if the incoming multicast information packet is associated with a multicast address stored in the software address store.

15. The computer program product of claim 13, further comprising fourth program instructions that prioritize the multicast addresses stored in the hardware address store on a most frequently used basis.

16. The computer program product of claim 13, further comprising fifth program instructions that prioritize the multicast addresses stored in the hardware address store on a most recently used basis.

17. The computer program product of claim 13, further comprising sixth program instructions wherein a list generator populates the hardware address store with multicast addresses and further populates the software address store with multicast addresses.

* * * * *